United States Patent [19]

Heiss et al.

[11] Patent Number: 4,564,367
[45] Date of Patent: Jan. 14, 1986

[54] SOLAR SALT CRYSTALLIZER AND PROCESS FOR PRODUCING SALT

[75] Inventors: John F. Heiss; Melvin E. Leverenz, both of St. Clair, Mich.

[73] Assignee: Diamond Crystal Salt Company, St. Clair, Mich.

[21] Appl. No.: 622,475

[22] Filed: Jun. 20, 1984

[51] Int. Cl.$^4$ .......................... B01D 9/02; B01D 1/00
[52] U.S. Cl. ..................................... 23/295 S; 23/300; 159/2; 159/42; 159/44; 159/46; 159/47.1; 203/3; 203/DIG. 1
[58] Field of Search ..................... 23/295 S, 298, 300, 23/306; 203/3, DIG. 1; 159/1 S, 1 SF, 42, 44, 46, 47.1

[56] References Cited

U.S. PATENT DOCUMENTS

| 874,906 | 12/1907 | Frasch . | |
|---|---|---|---|
| 874,907 | 12/1907 | Frasch . | |
| 2,383,234 | 8/1945 | Barnes | 159/1 S |
| 3,138,546 | 6/1964 | Muller | 203/DIG. 1 |
| 3,363,664 | 1/1968 | Villanueva . | |
| 3,527,676 | 9/1970 | Hingst et al. | 203/3 |
| 3,966,541 | 6/1976 | Sadan | 159/1 S |
| 4,072,472 | 2/1978 | Lukes . | |

OTHER PUBLICATIONS

The Production of Salt by Means of a Solar Pond; by: R. Matz et al; The Chemical Engineer; Apr., 1965; CE81–CE87.

Feasibility of Solution Mining for Sodium Carbonate at Searles Lake, California; by: J. Giulianelli et al; Aug. 81; 1–7.

Solar Ponds Collect Sun's Heat; by: R. K. Multer; Chemical Engineering; Mar. 8, 1982; 87–89.

Primary Examiner—David L. Lacey
Attorney, Agent, or Firm—Harness, Dickey & Pierce

[57] ABSTRACT

A solar crystallizer and a process for producing solar salt adaptable for use in climates heretofore believed unfavorable for solar salt production. The invention employs a solar crystallizer defining a shallow pond of salt solution the level of which is carefully monitored and controlled by withdrawing unsaturated solution from the upper stratum of the pond such as produced from rainfall and introducing substantially saturated brine into the pond at a lower stratum overlying the salt crop on the bottom thereof providing a continuous protective saturated brine layer and enhancing the efficiency of water evaporation by a comparatively shallow depth.

20 Claims, 4 Drawing Figures

SOLAR SALT CRYSTALLIZER AND PROCESS FOR PRODUCING SALT

BACKGROUND OF THE INVENTION

The present invention broadly relates to a solar salt crystallizer system and process for producing salt by solar techniques, and more particularly to an improved crystallizer arrangement and process which is adaptable for producing solar salt efficiently in climates heretofore believed unfavorable for solar salt production.

The conventional process for producing solar salt comprises an evaporation of seawater in a series of open ponds at ambient temperature in which the concentration of the salt progressively increases toward the last pond, called the crystallizer, in which sodium chloride crystals are recovered. Because of the influence of heavy rains and high humidity on the efficiency of such conventional solar processes, installations of seawater solar plants are usually restricted to such geographical regions which have low humidity and relatively low precipitation for at least a substantial portion of the year. Because of the reduced vapor pressure of salt brines, the presence of high humidity conditions severely restricts the ability to evaporate water to effect a concentration of such brines and the precipitation of salt therefrom. Similarly, in geographical regions which have heavy rains, dilution of the open ponds by such heavy rainfall drastically reduces the efficiency of salt production and may at times result in the complete loss of a salt crop from which the brine has been drained in preparation for harvest. For this reason, it is conventional practice in such seawater salt processes to maintain a relatively deep layer of brine over the salt bed to minimize dissolution of the salt crop as a result of heavy rainfalls.

The salt produced from seawater by solar evaporation is also characterized as containing substantial contaminating impurities including potassium chloride, calcium sulfate, magnesium chloride, magnesium sulfate the concentrations of which will vary somewhat depending on the geographical location. The presence of substantial amounts of such impurities may necessitate a purification of the harvested salt crop to increase its purity depending upon its intended end use.

The present invention overcomes the problems and disadvantages associated with prior art-type solar salt ponds and solar processes whereby the present invention produces a relatively high purity salt product, which is adaptable for operation in geographical areas in which the intensity and duration of sunshine, ambient temperatures, and precipitation are adverse to the production of solar salt, which can be geographically located at points remote from seawater supply, which generally requires less acreage, lower capital investment, and which is of simple and economical control and operation.

SUMMARY OF THE INVENTION

The benefits and advantages of the present invention are achieved by a solar crystallizer including a structure defining a shallow crystallizer pond containing an aqueous salt solution and provided with a substantially horizontal bottom and having the surface thereof exposed to solar radiation and ambient atmospheric conditions. A plurality of inlet conduits are disposed at spaced intervals along the crystallizer for discharging a substantially saturated brine into a lower stratum adjacent to the bottom thereof and above any salt crop deposited thereon. A plurality of outlet conduits are provided at spaced intervals for withdrawing liquid from an upper stratum of the solution in the crystallizer adjacent to the exposed surface thereof. The level of solution in the crystallizer is monitored and control means are provided for controlling the discharge of the substantially saturated brine into the crystallizer through inlet conduits in response to a reduction in the level of the solution in the crystallizer beyond a preset level while a withdrawal of solution from the upper stratum of the crystallizer through the outlet conduits is controlled in response to the increase of solution level beyond a preset level thereby maintaining the level of solution in the crystallizer within a preselected range.

The solar crystallizer system further includes means for saturating the brine prior to discharge into the lower stratum of the crystallizer pond which may comprise a natural subterranean salt bed, strata or dome, adapted for solution mining or may comprise a bed of solid salt such as rock or granulated salt to effect a saturation of the brine. The brine saturating arrangement preferably includes heat exchange means for effecting an increase in the temperature of the solution being saturated to facilitate faster dissolution of salt therein and to further effect a reduction in the concentration of contaminating calcium sulfate while further increasing the efficiency of salt production upon being discharged into the crystallizer pond at a temperature and salt concentration above that of the lower stratum of brine therein. The solar crystallizer system further contemplates a recirculation of all or a portion of the solution withdrawn from the upper stratum of the crystallizer pond which is subjected, when necessary, to resaturation and is returned into the lower stratum of the crystallizer pond through the inlet conduits. In accordance with a preferred embodiment, the salinity of the solution withdrawn from the crystallizer pond is continuously sensed and withdrawal thereof can be halted when it attains a saturated condition. Additionally, the salinity of the brine discharged to the crystallizer pond is monitored and the flow is halted in the event the brine is not substantially completely saturated. Under conditions of favorable evaporation rates and production of salt in the solar crystallizer, the system is further provided with makeup in the brine supply system for introducing fresh water or saline solution which subsequently is saturated before being discharged into the crystallizer pond to maintain solution level within prescribed limits.

In accordance with the process aspects of the present invention, the foregoing solar crystallizer system is employed for producing a high purity salt by which the solid salt crop accumulated on the bottom of the crystallizer is continuously blanketed with a protective layer of saturated brine introduced under conditions to provide laminar flow for separating and protecting the salt crop from any unsaturated solution thereabove as may be occasioned from time to time by the diluting effect of rainfall or other precipitation on the surface of the open crystallizer pond. A heating of the brine to a temperature above that of the solution in the solar crystallizer pond provides for further efficiency in salt production by causing a "salting-out" of salt from the incoming brine due to the rapid reduction of its temperature upon admixture with the cooler saturated brine in the lower stratum of the crystallizer pond.

In accordance with the foregoing arrangement of the solar crystallizer comprising the present invention, relatively shallow depths of solution or brine in the solar crystallizer can be maintained in comparison to depths normally employed in seawater solar evaporating ponds whereby a more rapid solar heating of the solution in the crystallizer pond is effected following sunrise achieving higher temperatures in the crystallizer thereby substantially increasing evaporation with a corresponding increase in salt production.

Additional benefits and advantages of the present invention will become apparent upon a reading of the detailed Description of the Preferred Embodiments taken in conjunction with the accompanying drawings.

DESCRIPTION OF THE PREFERRED EMBODIMENTS

Figure 1:
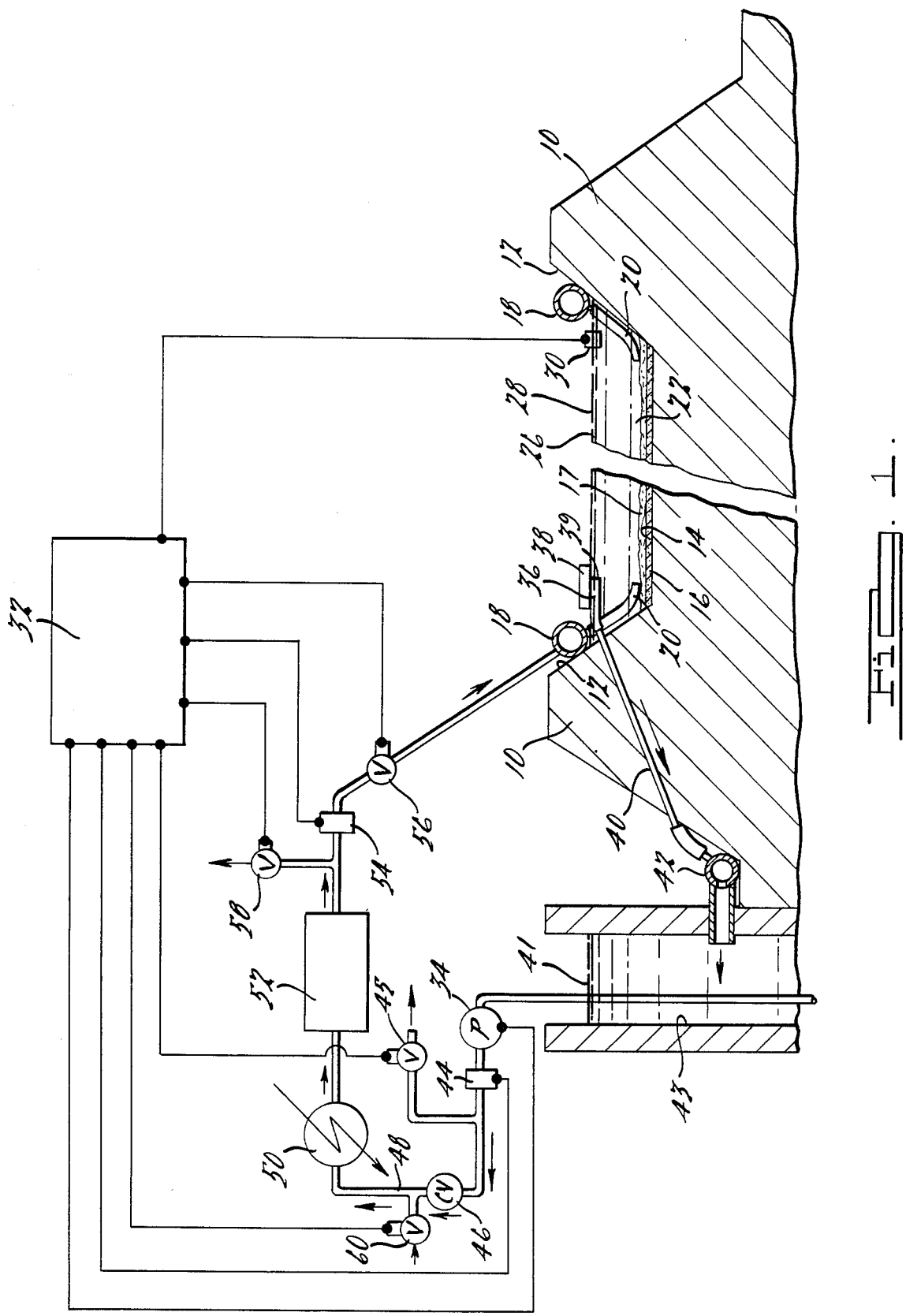
FIG. 1 is a fragmentary vertical sectional view of a solar crystallizer constructed in accordance with the preferred embodiments of the present invention including a schematic arrangement of associated conduits and controls.
Figure 3:
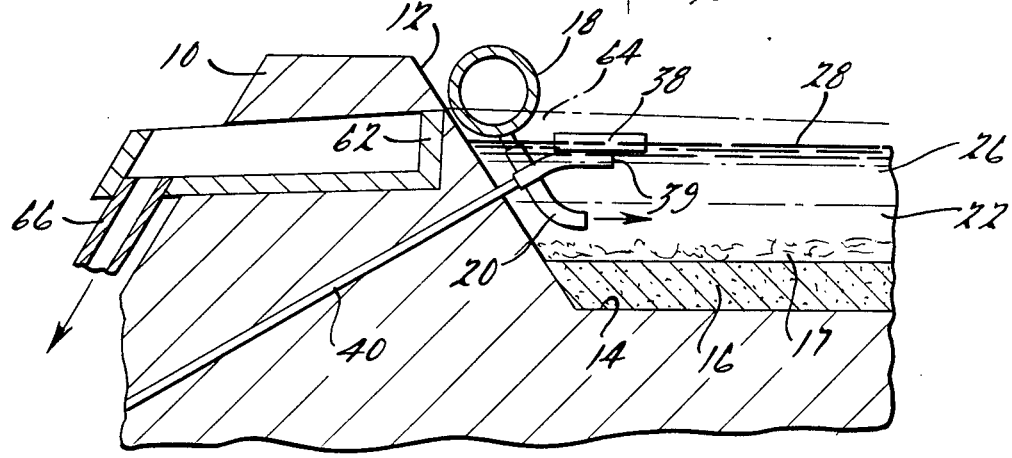
FIG. 3 is a magnified fragmentary vertical sectional view of an end wall of the solar crystallizer further illustrating the provision of an overflow weir therein.

With reference to the drawings, and as may be best seen in FIGS. 1 and 3, a solar crystallizer for producing salt in accordance with the present invention is defined by a structure preferably including an earth berm 10 which extends around the periphery of the crystallizer and is formed with an inwardly inclined sloping sidewall 12 terminating in a substantially horizontal bottom or floor 14 on which a layer of salt 16 is disposed. A relatively shallow aqueous solution of salt overlies the salt layer or floor 16 the depth of which is relatively small such as in the order of about 5 to about 7 inches in comparison to depths in excess of one foot as conventionally employed in solar ponds employed for producing salt from seawater. The relatively shallow depth of solution or brine in the crystallizer substantially reduces the time lag between cool evenings and warm daylight hours providing for relatively rapid solar heating of the solution in the crystallizer due to the reduced volume and heat capacity thereof. Accordingly, a more rapid warmup of the brine in the crystallizer occurs following sunrise thereby attaining higher temperatures more quickly and maximizing evaporation of water and the production of salt even in geographical locations where temperature and climatic conditions are normally considered unsuitable for solar salt production.

In accordance with a preferred practice, the salt floor 16 is continuously maintained over the bottom 14 of the crystallizer and is usually controlled at a depth greater than about 1 inch up to about 3 inches over which newly produced salt is deposited and is periodically harvested leaving the residual salt floor. In this way, percolation of solution through the bottom is inhibited maintaining liquid-tight integrity of the crystallizer. The salt floor also prevents contamination of the harvested salt crop by sand, clay or earth of which the crystallizer is constructed during harvesting operations.

A harvesting of the salt crop layer indicated at 17 in FIGS. 1 and 3 deposited on the salt floor 16 can be performed in a continuous or a periodic intermittent manner depending on salt production rate and is generally performed when an accumulation of the desired depth occurs on the upper surface of the salt floor 16. The permissible depth of the salt crop is somewhat dictated by the depth of brine solution required over the salt crop to provide adequate protection in the event of heavy precipitation. In accordance with a preferred practice of the present invention, a harvesting of the salt crop is performed while retaining the protective layer of brine over the crop to avoid inadvertent loss of dissolution as a result of sudden heavy rains.

It will be appreciated, that the shallow depth of solution in the solar crystallizer renders the salt crop as well as the salt floor susceptible to loss by redissolution as occasioned by heavy precipitation in the form of rain, snow or the like. Such loss of salt crop as frequently experienced in conventional solar ponds is prevented by a solution recirculation and resaturation system which continuously blankets the upper surface of the salt crop with a saturated brine and further serves to extract unsaturated brine from the upper surface of the solution level to effect a rapid initiation of salt production following a heavy rainfall.

Figure 2:
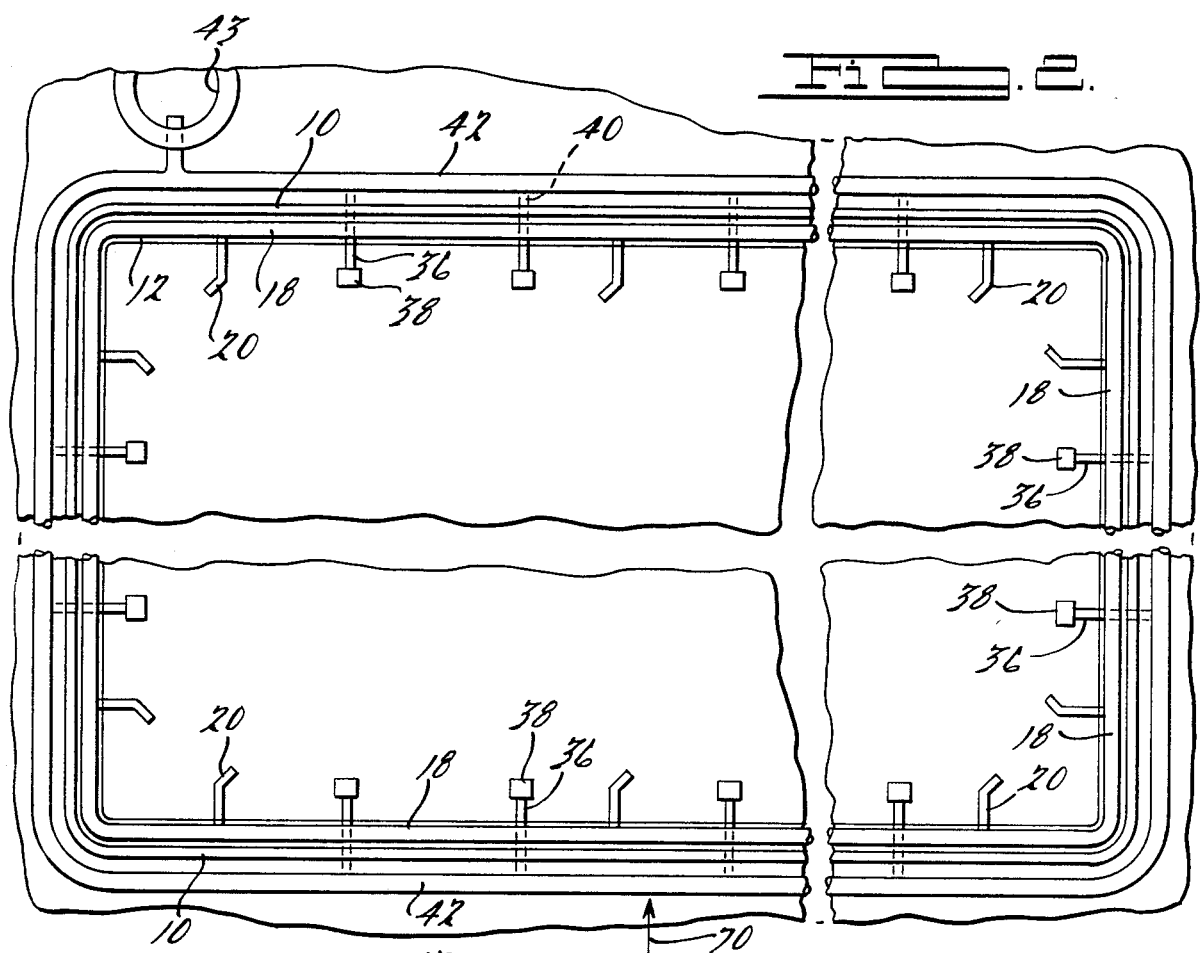
FIG. 2 is a fragmentary plan view of the solar crystallizer shown in FIG. 1.

The solution recirculation system as shown in FIGS. 1 and 2 comprises a brine header conduit 18 which extends along the sidewall 12 arouond the periphery of the crystallizer and is provided with a plurality of inlet conduits 20 extending downwardly therefrom for discharging a substantially saturated brine into a lower stratum indicated at 22 in FIGS. 1 and 3 adjacent to the bottom of the crystallizer and above any salt crop layer 17 accumulated therein. The discharge ends of the inlet conduits 20 as best seen in FIG. 2 are angularly oriented with respect to the sides of the crystallizer such as at an angle of about 45 degrees to impart a circular motion to the solution in the crystallizer. The flow of saturated brine in a circular motion enhances crystal growth as well as uniformity in the distribution of saturated brine through the lower stratum 22.

The discharge of saturated brine into the crystallizer at the lower stratum of solution therein is performed under flow conditions which provide a laminar flow as opposed to a turbulent flow whereby a substantially continuous blanket of saturated brine is maintained over the underlying salt crop. This protective brine layer prevents redissolution of the salt crop and salt floor even during periods of heavy rainfall in which an upper stratum 26 of solution in the crystallizer may have become diluted. The higher density of the saturated brine relative to water or unsaturated brine in combination with the laminar flow pattern assures continuity of the protective brine layer throughout the entire lower stratum 22.

The upper surface 28 of the solution in the solar crystallizer is exposed to solar radiation and to ambient air currents in a manner to effect evaporation of water therefrom and a concentration of the entire solution into a saturated brine from which salt crystals precipitate. It has been observed that initiation of salt production commences by the formation of tiny salt crystals which float at the upper surface and upon further growth attain a density in which they drop downwardly to the bottom of the crystallizer at which further crystal growth occurs. In accordance with this mechanism, it will be appreciated that any precipitation resulting in a dilution of the brine causing an unsaturation of the upper stratum thereof substantially reduces the efficiency of salt production until such time that the upper stratum again becomes saturated brine. Precipitation such as heavy rainfall will also result in a rise in the normal level of solution in the solar crystallizer and the level of solution therein is continuously monitored such as by a suitable level sensing device diagrammatically illustrated at 30 in FIG. 1 of the drawings. The level sensing device may be of any of the types known in the art and preferably comprises a differential pressure cell employing solid state circuitry in which pressure differentials occurring as a result of fluctuations in solution level are transmitted through isolating diaphragms and oil fill fluid to a sensing diaphragm which deflects in response to the differential pressure across the diaphragm and whereby the resultant displacement in proportion to differential pressure is detected by capacitor plates and is transmitted to the central control system diagrammatically indicated at 32 in FIG. 1. A differential pressure cell and transmitter system particularly suitable for use in accordance with the present invention comprises model 1151DP Alphaline Transmitter available from Rosemount, Inc. of Minneapolis, Minn. The foregoing differential pressure transmitter can be calibrated to detect fluctuations in solution level as small as about 0.01 inch.

In accordance with the arrangement illustrated in the drawings, the upper stratum 26 of the solar crystallizer is disposed in communication with a plurality of outlet conduits 36 which are of a flexible tubular construction and are provided with floats 38 for maintaining the inlet ports 39 thereof adjacent to the upper surface 28 of the solution. The outlet conduits 36 are connected by conduits 40 through a flexible hose to a header pipe 42 extending around the periphery of the berm 10. The header pipe 42 is preferably provided with a series of sections such that solution skimmed from the upper stratum can selectively be withdrawn along one side or one end of the crystallizer as well as combinations of the foregoing consistent with prevailing wind conditions and surface wave action to enhance extraction of unsaturated brine. The header 42 serves to collect the solution skimmed or withdrawn from the upper stratum which drains to a pit or sump 43 as shown in FIG. 1. During periods when the upper level of solution in the solar crystallizer is within preset levels, the level of solution in the sump 43 indicated at 41 in FIG. 1 is equal to the level of solution in the solar crystallizer so that no differential head exists therebetween. Under such condition, the header 42, conduits 40 and associated tubing are full of solution and no gravitational flow occurs.

When the level of solution in the solar crystallizer rises as occasioned by rainfall, the rise in level is detected by the level sensing device which in turn communicates this condition to the central control system and whereby a pump 34 is energized effecting a withdrawal of solution from the sump 43 causing its level 41 to drop thereby initiating gravitational flow of liquid through the outlet conduits 36 and through the skimming system into the sump. The skimming or decanting operation continues until such time that the pump 34 is deenergized to permit the level 41 in the sump 43 to again rise to the level of the solution 28 in the solar crystallizer.

The solution pumped from the sump 43 by the pump 34 passes through a salinity detector 44 of any of the types known in the art which is connected to the central control system 32. Preferably, the salinity detector is of the type which measures conductivity of the solution as a function of salt concentration compensated for temperature and an electrodeless conductivity analyzer and transmitter particularly suitable for use with such corrosive brine solutions comprises a model 723 commerically available from Rosemount, Inc.

The withdrawn solution after passing through the salinity detector 44 passes through a checkvalve 46 to prevent solution back-flow and thereafter is transported through a conduit 48 which is preferably provided with a heat exchange device 50 for effecting a heating of the withdrawn solution to an elevated temperature. The heat exchanger may employ waste hot water or waste steam and may also employ a solar nonconvecting pond as a heat source. The use of a solar nonconvecting pond is particularly beneficial in that natural solar radiation can also be employed for this purpose.

The heated recirculating solution passes from the heat exchanger 50 through a saturating device 52 by which the recirculating solution is contacted with salt at the then prevailing temperature of the solution to effect a substantially 100 percent saturation thereof. The saturating device 52 may comprise a porous bed of salt through which the solution is percolated and preferably, in geographical locations having salt deposits, comprises a subterranean deposit of salt through which the solution is pumped such as through suitable wells to effect a saturation thereof. The use of a subterranean salt deposit equipped with recirculating wells provides a further distinct advantage in that the concentration of calcium sulfate, a contaminant, can be substantially reduced in the salt crop harvested from the solar crystallizer by precipitating calcium sulfate in the subterranean cavity by virtue of its reduced solubility at higher solution temperatures and at higher salinities. Accordingly, by preheating the solution to an elevated temperature in the heat exchanger 50, the hot solution entering the salt cavity causes a substantial amount of calcium sulfate to precipitate in the cavity while at the same time increases the solubility of sodium chloride for dissolution.

The saturated brine upon emergence from the saturating device 52 passes through a second salinity detector 54 connected to the central control system for monitoring the saturation thereof to assure that only saturated brine is returned to the solar crystallizer. If the brine passing through the second salinity detector 54 is below saturation, the central control circuit is operative to close a solenoid actuated valve 56 halting further flow of brine to the brine header 18. Under such circumstances, the pump 34 can also be deactivated if the solution level in the solar crystallizer is within permissible preset levels or, alternatively, the control concuit is operative to actuate a solenoid valve 58 whereby the solution from the saturating device 52 is transferred to a holding tank or holding pond (not shown) for future recovery and saturation. After saturation, the brine can be returned to the solar crystallizer under conditions when the solution level therein is permissive of the addition of brine thereto. Alternatively, the saturated brine can be transferred to a conventional evaporative pan crystallizer or can be sold for use in chemical operations requiring salt brines such as a chlor-alkali plant.

The solution recirculating system is also provided with a solenoid valve 60 connected to the conduit 48 by which make-up water or saline solution can be added under pressure to the system during favorable evaporating conditions in which the solution level in the solar crystallizer falls below a preset level as sensed by the level sensing device. The solenoid valve 60, accordingly, can introduce an aqueous solution such as previously stored in the holding tank or pond or can introduce fresh water for subsequent saturation in the saturating device 52. It is also contemplated, as in conventional solar salt concentrating ponds for seawater, that the solenoid valve 60 can be connected to one of the concentrating ponds for discharging a partially saturated saline solution under pressure into the system which becomes fully saturated in the saturating device 52.

The several valves, sensing devices and pump of the solar crystallizer system are coordinated by the central control circuit to assure continuous operation of the system and to maintain the level of solution in the crystallizer within preset limits. Under the condition wherein favorable evaporation of water from the solar crystallizer occurs in the absence of any significant precipitation, salt is produced in response to the evaporation of water and the level of solution in the crystallizer progressively falls which is sensed by the level sensing device 30. Under such condition, make-up solution is required whereby control valve 60 is positioned to admit additional solution under pressure into the system which is preferably heated and saturated and thereafter passes to the brine header 18 for discharge through the inlet conduits 20 into the lower stratum of the solution therein. Under conditions where the saturated brine transferred to the lower stratum 22 is of a temperature above that of the solution in the crystallizer, a preliminary salting out occurs as a result of the rapid diffusion and cooling of the incoming brine resulting in the formation of additional salt crystals further enhancing productivity. This arrangement continues until such time the appropriate solution level is restored and thereafter an intermittent and/or continuous replenishment of saturated brine to the crystallizer will occur to maintain the level within preset limits.

Under a condition in which unfavorable evaporation rates occur accompanied by heavy atmospheric precipitation, the level of solution in the crystallizer will rise as sensed by the level sensing device 30 signaling the central control circuit which effects a closing of control valve 60 and an energization of the pump 34 whereby the level of solution 41 in the sump 43 drops causing a skimming of solution from the upper stratum 26 of the crystallizer. The salinity of the solution removed is sensed by the salinity sensing device 44 and when below saturation, the pump 34 causes the withdrawn solution to be recirculated for heating and saturation and for return to the crystallizer to effect resaturation of the entire solution therein. The skimming and withdrawal of unsaturated solution form the upper stratum of the crystallizer and the resaturation and recirculation thereof back to the lower stratum of the crystallizer rapidly restores the solution in the solar crystallizer to a fully saturated condition following such a rainfall whereby salt production is again initiated. When the entire solution in the solar crystallizer again becomes saturated, the salinity sensing device 44 signals the control circuit that the solution withdrawn from the upper stratum is saturated. At the same time, the level sensing device signals the central control circuit that the level of brine in the solar crystallizer is below a preset maximum level whereby the control system deenergizes the pump 34 and a skimming of the liquid in the upper stratum of the crystallizer ceases. As further evaporation of water occurs from the solar crystallizer and when a preset minimum level is again attained as sensed by the level sensing device, the central control circuit positions control valve 60 to a condition in which make-up solution under pressure is again introduced into the system.

Under a condition when the level of solution in the solar crystallizer exceeds the preset maximum level as occasioned by sustained and/or heavy precipitation in spite of a continuous skimming of solution from the upper stratum of the solar crystallizer, the level sensing device 30 signals the central control circuit 32 of such condition whereby solenoid valve 56 is closed halting the introduction of saturated brine to the crystallizer while valve 58 remains closed and solenoid valve 45 is opened such that the unsaturated withdrawn solution is diverted to a holding tank or holding pond (not shown). At such point where the level of the solution in the crystallizer is restored to an acceptable level, the solenoid valve 56 is opened and the solenoid valve 45 is closed whereby the heated saturated brine is again introduced into the lower stratum of the crystallizer. At the same time, further skimming of the surface of the solution occurs whereby the diluted brine upper layer is progressively removed from the crystallizer and is replaced with saturated brine. This continues until all of the solution in the crystallizer again attains full saturation such that the withdrawn solution comprises saturated brine which is sensed by the salinity detector 44 effecting a de-energization of the pump 34 halting further withdrawal.

In a solar crystallizer of the type as illustrated in the drawings containing a relatively shallow layer of solution therein, the present maximum level is set at about eight inches above the upper surface of the salt floor 16 at which the solenoid valve 56 is closed and the diversionary solenoid valve 45 is opened. The normal operating level of solution above the salt floor is about five inches. When the level increases to about five and one-quarter inches, the level sensing device responsive to the control circuit initiates operation of the pump 34 to skim and resaturate solution from the upper stratum thereof which is indicative of some precipitation entering the solar crystallizer. A typical preset minimum level is about four and one-half inches above the upper surface of the salt floor at which the solenoid valve 60 is opened to introduce make-up solution into the solar crystallizer and such make-up solution continues to be introduced until the operating level of about five inches is again attained in which event valve 60 closes. In accordance with the foregoing typical operating parameters, make-up solution is introduced into the solar crystallizer when the operating level above the salt floor is within the range of about four and one-half to about five inches. No solution is introduced or withdrawn from the solar crystallizer when its level ranges from about five to about five and one-quarter inches above the salt floor and when the crystallizer contains substantially saturated brine. A skimming and withdrawal of solution from the upper stratum of the solar crystallizer and the introduction of substantially saturated brine into the lower stratum occurs when the solution level ranges from about five and one-quarter inches up to about eight inches. Above eight inches, solution is withdrawn from the upper stratum and is diverted to the holding tank or holding pond. It will be appreciated that the foregoing typical operating parameters can be varied in consideration of the particular climatic conditions in which the solar crystallizer is located to provide for optimum salt production.

It will be appreciated from the foregoing, that maximum efficiency in the production of a relatively high purity salt can be achieved not only in climates normally considered unacceptable for solar salt production, but also substantial improvements in efficiency can be achieved in conventional solar salt ponds located in geographical areas particularly amenable to solar salt production. The combination of employing a relatively shallow level of solution in the solar crystallizer coupled with a complete resaturation of solution before discharge into the solar crystallizer maximizes evaporative efficiency of the crystallizer and enables commercially economical salt production even in geographical areas having a negative evaporation rate, i.e., where the average precipitation is greater than the average evaporation rate.

The solar crystallizer operates as an evaporative crystallizer during daylight hours as a result of solar radiation on the surface thereof effecting a heating of the solution therein and the evaporation of water promoting salt crystal formation and growth and precipitation. After sundown, a cooling of the solution occurs and in the absence of any precipitation, the crystallizer operates as a cooling crystallizer effecting further salt crystal formation, growth and precipitation as the temperature of the solution falls to maintain saturation at the decreasing temperature levels. After attaining a minimum temperature at or shortly before sunrise, the solution is progressively heated by solar radiation whereby the brine in the crystallizer becomes unsaturated at the then elevated temperature. During the progressive warmup during the morning hours, the skimming system serves to remove the under-saturated solution from the upper stratum of the crystallizer which is recirculated and resaturated preferably at an elevated temperature and is again discharged into the lower stratum of the crystallizer maintaining the solution therein at substantially saturation in spite of the continuing rise in temperature. As the temperature of the solution further rises in response to solar radiation, the rate of evaporation of water from the solution increases promoting the maintenance of a saturated condition in which further salt is produced as a result of evaporative crystallization. Because of the shallow depth of the solution in the solar crystallizer and the corresponding low heat capacity thereof, it has been observed by experimentation that the temperature of the solution in the crystallizer during non-daylight hours lags but substantially parallels the surrounding ambient air temperature.

The production of salt can be optimized for any particular geographical location in consideration of prevailing wind directions by orienting the solar crystallizer such as shown in FIG. 2 whereby wave action on the surface is minimized by orienting the long section of the pond perpendicular to the direction of the prevailing wind as indicated by the arrow 70 of FIG. 2. FIG. 2 is also illustrative of a preferred arrangement of the inlet conduits 20 and outlet conduits 36 in which their respective positions are staggered around the entire periphery of the solar crystallizer. An arrangement which has been found particularly satisfactory is one in which the inlet conduits 20 for introducing the saturated brine are disposed approximately 40 feet from one another while the outlet conduits 36 are spaced about 20 feet from one another and are staggered at about 10 feet to each side of each inlet conduit. This arrangement further assures against intermixing of incoming and outcoming streams maintaining the appropriate salinity gradient through the depth of the solution during such times that the upper stratum becomes unsaturated. It will be understood that the specific relative disposition of the inlet and outlet conduits as illustrated in FIG. 2 can be varied consistent with alternative skimming arrangements and conduits designs to provide optimum operation.

Figure 4:
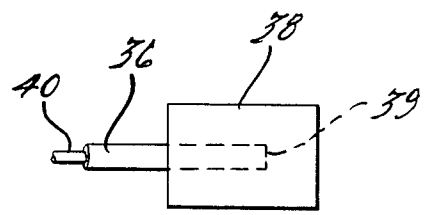
FIG. 4 is a plan view of the float and outlet conduit arrangement of the skimming system.

As had been previously indicated, it has been observed that initiation of salt production commences by the formation of tiny salt crystals which float at the upper surface of the brine which upon further growth attain a density in which they drop downwardly to the bottom of the crystallizer. In view of the presence of such minute salt crystals floating on the upper surface of the solution in the solar crystallizer, the skimming system for withdrawing solution from the upper surface thereof is designed to prevent a withdrawal of such minute crystals during a skimming operation. As may be best seen in FIGS. 3 and 4, the float 38 attached to the flexible outlet conduits 36 is positioned so as to extend beyond the inlet port 39 of the outlet conduit such that the side edges of the float 38 form a dam. This minimizes removal of such tiny floating salt crystals in that the side edges of the float extend downwardly beneath the upper surface of the brine solution a distance sufficient to trap such salt crystals around the periphery thereof preventing their entrance into the inlet port 39.

In accordance with a further preferred embodiment of the present invention, an overflow weir 62 as shown in FIG. 3 is provided along the ends of the solar crystallizer as well as along selected side sections thereof in accordance with the specific size of the crystallizer to provide for emergency overflow of liquid from the upper surface as occasioned by heavy precipitation accompanied by strong surface winds. Under such conditions in which heavy rainfall occurs and the direction of the wind is substantially parallel to the long sides of the solar crystallizer as illustrated in FIG. 2, the rainwater entering the solar crystallizer will be blown in the form of a wedge indicated at 64 in FIG. 3 from the windward end to the leeward end. The strong wind coupled with the lower density of fresh water relative to the underlying brine may cause a differential in solution level as much as one inch depending upon the length of the solar crystallizer. Under such conditions, the skimming system may be ineffective to remove the sudden increase of rainwater accumulating at one end or along certain side sections of the crystallizer whereby such excess precipitation is removed by overflow of the weir 62 and the solution thus withdrawn is discharged through a conduit 66 directly to the sump 43 or to a suitable holding tank or holding pond. The upper edge of the weir 62 is set a fraction of an inch, such as about one-quarter inch above the maximum preset level such that the skimming system will generally remove such excess precipitation in the absence of high surface winds.

It will be appreciated that when the solar crystallizer is of a substantially large area, it is desirable to employ a plurality of the sumps 43 each provided with a pump 34 at spaced locations around the periphery of the crystallizer and adjacent to the weirs 62 to accommodate and remove liquid withdrawn during periods of excessive precipitation. The extraction of excessive solution from the pond by overflow of the weir 62 has been found particularly effective when such overflow is directionally assisted by surface winds blowing substantially perpendicular to the weir.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A solar crystallizer for producing salt comprising;
   (a) means defining a shallow pond containing an aqueous salt solution provided with a substantially horizontal bottom and having the surface thereof exposed to solar radiation,
   (b) inlet conduits positioned and arranged for discharging a substantially saturated brine into said pond at a lower stratum adjacent to the bottom thereof and above any salt crop deposited thereon,
   (c) outlet conduits positioned and arranged for withdrawing solution from an upper stratum of the pond adjacent to the exposed surface thereof,
   (d) level sensing means for sensing the level of solution in said pond,
   (e) supply means for discharging brine into said pond through said inlet conduits in response to the solution level being disposed within a preselected range,
   (f) skimmer means for withdrawing solution from said pond through said outlet conduits in response to the increase of solution level beyond a preset level,
   (g) saturating means in said supply means for effecting substantially complete saturation of the brine discharged through said inlet conduits and
   (h) control means operatively associated with said level sensing means, supply means, skimmer means and saturating means for controlling, in response to said level sensing means, said supply means, skimmer means and saturating means.

2. The solar crystallizer as defined in claim 1 further including heating means in said supply means for heating said brine to a temperature above the temperature of solution in said pond.

3. The solar crystallizer as defined in claim 1 in which said inlet conduits are arranged to discharge said brine at a plurality of spaced locations into said lower stratum.

4. The solar crystallizer as defined in claim 1 in which said inlet conduits are arranged to discharge said brine at a plurality of spaced locations around the periphery of said pond into said lower stratum.

5. The solar crystallizer as defined in claim 1 in which said inlet conduits are arranged to discharge said brine at a plurality of spaced locations into said lower stratum at an angular orientation to impart circular movement of said solution in said pond.

6. The solar crystallizer as defined in claim 1 in which said outlet conduits are arranged to withdraw said solution from said upper stratum at a plurality of spaced locations in said pond.

7. The solar crystallizer as defined in claim 1 in which said outlet conduits are arranged to withdraw said solution from said upper stratum at spaced locations around the periphery of said pond.

8. The solar crystallizer as defined in claim 1 in which said outlet conduits include flotation means for buoyantly supporting said outlet conduits on the surface of said pond.

9. The solar crystallizer as defined in claim 1 further including first salinity sensing means positioned and arranged with respect to said outlet conduits for sensing the salinity of the solution withdrawn from said upper stratum and means operatively associated with said salinity sensing means for stopping withdrawal of solution from said upper stratum when said solution is substantially saturated.

10. The solar crystallizer as defined in claim 1 further including second salinity sensing means associated with said inlet conduits for sensing the salinity of said brine and means operatively associated with said second sensing means for stopping discharge of brine into said lower stratum when the sensed salinity of said brine drops a preset concentration below saturation.

11. The solar crystallizer as defined in claim 1 further including recirculating means for recirculating at least a portion of the solution withdrawn from said upper stratum by said skimmer means to said saturating means.

12. The solar crystallizer as defined in claim 1 further including means operatively associated with said level sensing means for introducing make-up solution to said supply means in response to said level sensing means.

13. The solar crystallizer as defined in claim 1 further including diverting means in said supply means for diverting said brine to a secondary location in response to said level sensing means.

14. The solar crystallizer as defined in claim 1 further including heating means in said supply means for heating the solution prior to entry into said saturating means to a temperature above the temperature of said solution in said crystallizer.

15. The solar crystallizer as defined in claim 14 in which said heating means comprises a solar pond heat exchanger.

16. The solar crystallizer as defined in claim 14 in which said heating means comprises a waste heat exchanger.

17. The solar crystallizer as defined in claim 1 in which said saturating means comprises a natural salt deposit.

18. The solar crystallizer as defined in claim 1 in which said saturating means comprises a bed of impure salt.

19. A process for producing salt employing a solar crystallizer which comprises the steps of providing a shallow pond containing an aqueous salt solution formed with a substantially horizontal bottom and having the surface thereof exposed to solar radiation, sensing the level of solution in said pond, discharging a substantially saturated brine into a lower stratum of said pond adjacent the bottom thereof in a manner to overlie a salt crop deposited thereon in response to the level of solution decreasing to a preset level, withdrawing solution from said pond at an upper stratum adjacent to the surface thereof in response to the level of solution in said pond increasing above a preset level, controlling the discharging of brine and the withdrawing of solution from said pond in a manner to maintain the level of solution therein within a preset range, permitting evaporation of water from the surface of said pond in response to solar radiation and ambient air currents to effect precipitation of salt to the bottom of the pond and periodically harvesting the crop of salt accumulated from the bottom of the pond.

20. The process as defined in claim 19 in which the step of harvesting the crop of salt is performed to retain a residual layer of salt over the bottom of said pond.

* * * * *